Patented Dec. 3, 1940

2,223,925

UNITED STATES PATENT OFFICE 2,223,925

SPRAY-DRIED SUGAR MIXTURE AND PROCESS

James F. Walsh, Tuckahoe, N. Y., assignor to American Maize-Products Company, a corporation of Maine No Drawing. Application August 31, 1939,
Serial No. 292,800

5 Claims. (Cl. 127—30)

My invention relates to spray-dried sugar mixtures and more particularly to a process of stabilizing the sugar mixture prior to drying to inhibit inversion of the sugar and thereby maintain the reducing sugars content of the final product substantially constant.

The product of this invention comprises generally a spray-dried mixture of sucrose and starch conversion syrup in which the latter is usually present in a major proportion. Also, the product is relatively non-hygroscopic and is dehydrated to a low moisture content of not more than about 3%. The tendency toward inversion of the sucrose in this product with corresponding increase in total reducing sugars content, is minimized so that the product is substantially stable against inversion during processing and use.

A difficulty commonly encountered in the commercial production of mixed sugar products containing sucrose, is that the sucrose undergoes substantial inversion into the reducing sugars dextrose and laevulose and this causes undesired properties in the final product. This inversion may take place in the process of preparation of the mixed product and also during subsequent use where the sucrose is dissolved, particularly when accompanied by heat.

The amount of inversion that takes place varies generally with the amount of starch conversion syrup present and is affected particularly by the impurities in the syrup. Likewise the conditions to which the mixed product is subjected affect the amount or extent of inversion. If inversion is substantial the final dried product will tend to be hygroscopic and therefore unstable on exposure. Moreover, when the inverted product is used in various confections it will produce undesired soft and sticky products.

I have found that the impurities, salts and acids in the starch conversion syrup is one of the principal causes of the inversion of the sucrose and that by neutralizing the syrup to a proper pH value before the mixture is dried, the inverting action of these constituents is buffered and the adverse effects thereof avoided. Neutralization of the starch conversion syrup may be carried out before the syrup is mixed with the sucrose or the mixture of syrup and sucrose may be neutralized before drying.

The pH value of starch conversion syrup such as, for example, corn syrup or commercial glucose, is normally about 4.5 to 5.5. Preferably it is kept as low as possible to minimize discoloration of the syrup in transit and storage. For purposes of my invention, however, I have found that the pH value of this syrup should be raised to a value of about 6 to 7. A range which I have found commercially advantageous is about 6.4 pH to 6.6 pH. This pH adjustment may be obtained by adding to the syrup any suitable alkaline substance such as sodium or potassium hydroxide or carbonate. If, contrary to the usual case, the initial pH of the syrup is above the desired range of 6 to 7, an acid or acidic substance such as for example mineral acids, would be used for the neutralization. After the syrup is neutralized it should, in the usual case, be filtered to remove impurities and substances that are coagulated at the adjusted pH value.

The adjustment of pH of the starch conversion syrup or mixture of the syrup and sucrose has a very marked effect upon the inversion properties as shown by the following. If the commercial glucose of usual 4.5 to 5.5 pH is combined with sucrose and the product dried, inversion of the sucrose to an extent of about 15% to 20% will take place. However, if the pH is adjusted to a value of about 6 to 7 in accordance with my invention the inversion is reduced to an almost negligible amount, such as 1% to 2%.

The starch conversion syrup may be obtained by conventional conversion treatment of starch or starch and protein mixtures obtained from various starchy materials such as corn, wheat, rice, potatoes, beans and peas. The conversion may be effected by means of acid or enzymes or combinations thereof. In the usual case the starchy material substantially freed of fiber, oil and proteins will be subjected to the action of acids under heat and pressure. According to the well known procedure, the starch is converted into a liquor or syrup containing a mixture of the reducing sugars, dextrose and maltose, and the lesser converted materials principally dextrins. One well known commercial form of this conversion syrup is corn syrup or commercial glucose, having a reducing sugars content of about 40–42%.

The sugar or sucrose which is to be incorporated with the starch conversion syrup is in the form of a dry, water soluble crystalline solid. The predominant example of this crystalline sugar is cane sugar but the sugar obtained from sugar beets may be used as well. The term "sucrose" has been used in a generic sense in the specification and claims herein to include cane sugar, beet sugar and any equivalent form of sugars.

The following more specific, but non-limiting description will provide a clearer understanding of my invention.

In this instance the starch conversion syrup used is that obtained in the conversion of corn starch with acid, heat and pressure treatment in conventional manner until a syrup of approximately 30° Baumé is produced. This syrup is bleached and normally conducted to the evaporating pans for final concentration. This corn syrup is now adjusted in accordance with my invention to a pH value of 6 to 7. Next, the sucrose in an amount usually less than that of the corn syrup and preferably in an amount of about one-third the weight of the final product, is added to the hot conversion syrup and quickly dissolved. The mixture of conversion syrup and liquid sucrose is now treated with bleaching carbon or bone char and filtered to remove foreign matter and impurities. The resulting filtered liquor is concentrated or diluted as desired to make it suitable for the spray drying operation. Usually the amount of solids in the liquid mixture for spray drying is about 50% by weight but this may vary appreciably.

The spray drying treatment may be carried out according to any suitable known manner. For example, the heated mixture of corn syrup and sucrose, described above, may be atomized through a spray nozzle and sprayed into a desiccating chamber containing heated gases to dry the atomized particle. Preferably toward the bottom of the desiccator there is introduced a flow of cold dehumidified air to lower the temperature of the spray dried material to a point (less than about 100° F.) where it may be bagged without danger of caking. The spray dried material is advantageously dehydrated by this treatment to the point where it will contain not more than about 3% moisture and preferably less than 3%.

An alternate procedure to that described above would be to use a corn starch conversion liquor which had been converted at about a 24° Baumé starch suspension, neutralized to a pH value of 3.5 to 4.5% and filtered with filter aid to remove the coagulated proteins. Next, the filtered material is bleached with carbon or other bleaching agent and the pH adjusted to a value of about 6.4 to 6.6. The Baumé of the starch suspension at this stage would be about 20°. To this pH adjusted suspension about 25% by weight of crystalline sucrose is added and the resulting liquid is filtered if necessary to remove foreign matter and then spray dried as described above. A commercially advantageous feature of this process is that bleaching of the heavy conversion liquor is eliminated. The dissolved sugar in this instance would raise the concentration of the mixture satisfactorily for spray drying.

The products obtained from either of the above described methods would be free-flowing, powdery types of materials having little or no color and being readily soluble in water. This product could be used in many instances in place of sucrose and because of the constituents in the solidified starch conversion syrup, particularly the dextrins, the product would offer advantages over sucrose in certain uses such as in the bakery, confectionery and ice-cream field.

Various modifications and changes may be made in the above described materials and procedures without departing from the scope of my invention, some of the novel features of which are defined in the appended claims.

I claim:

1. A process of producing a free flowing, non-caking solidified starch conversion syrup-sucrose product containing a substantial amount of sucrose but being stable against inversion, comprising treating the liquid starch conversion syrup to give it an accurate pH value of about 6 to 7 so as to buffer the sucrose inverting action of the acids, salts and impurities contained in the syrup, blending the syrup with the sucrose to provide an intimate mixture thereof and spray drying said mixture for producing a stable dried product which because of its substantial freedom from inversion products has high resistance to caking.

2. A process of producing a free flowing, non-caking solidified starch conversion syrup-sucrose product containing a substantial amount of sucrose and a greater amount of conversion syrup but being stable against inversion, comprising treating the liquid starch conversion syrup to give it an accurate pH value of about 6.4 to 6.6 so as to buffer the sucrose inverting action of the acids, salts and impurities contained in the syrup, blending the syrup with the sucrose to provide an intimate mixture thereof and spray drying said mixture for producing a stable dried product which because of its substantial freedom from inversion products has high resistance to caking.

3. A process of producing a free flowing, non-caking solidified starch conversion syrup-sucrose product containing a substantial amount of sucrose but not more than about one third of the weight of the final product and being stable against inversion, comprising treating corn syrup with a neutralizing substance to give the syrup an inversion resistant pH value of about 6 to 7 and to coagulate impurities and undesired substances, treating the syrup to remove the coagulated substances, blending the treated syrup and the sucrose to provide an intimate mixture thereof and spray drying said mixture to produce a stable dried product which because of its substantial freedom from inversion products has high resistance to caking.

4. A process of producing a free flowing, non-caking solidified starch conversion syrup-sucrose product containing about one fourth sucrose and three fourths conversion syrup and being stable against inversion, comprising treating corn syrup with a neutralizing substance to give the syrup an inversion resistant pH value of about 6 to 7 and to coagulate impurities and undesired substances, adding decolorizing carbon to bleach the syrup, filtering to remove the coagulated substances, blending the treated syrup and the sucrose to provide an intimate mixture thereof and spray drying said mixture to produce a stable dried product which because of its substantial freedom from inversion products has high resistance to caking.

5. A stable, spray dried, free flowing solidified starch conversion syrup-sucrose product resulting from the treatment specified in claim 1 and containing not more than about 2% of sucrose inversion substances, said product being substantially resistant to caking and comprising discrete particles of combined sucrose and solidified syrup.

JAMES F. WALSH.